US005642975A

United States Patent [19]
Epstein

[11] Patent Number: 5,642,975
[45] Date of Patent: Jul. 1, 1997

[54] DEVICE FOR FITTING SHOP WINDOWS

[76] Inventor: Benoit Dov Epstein, Manoir de Beauvoir, F-14140 Tortisambert, France

[21] Appl. No.: 624,580

[22] PCT Filed: Oct. 6, 1994

[86] PCT No.: PCT/FR94/01171

§ 371 Date: Jul. 15, 1996

§ 102(e) Date: Jul. 15, 1996

[87] PCT Pub. No.: WO95/09788

PCT Pub. Date: Apr. 13, 1995

[30] Foreign Application Priority Data

Oct. 6, 1993 [FR] France .................. 93 12093

[51] Int. Cl.⁶ ............................................. E04G 21/14
[52] U.S. Cl. ........................... 414/11; 414/590; 414/737
[58] Field of Search ........................ 414/11, 589, 590, 414/735, 737, 738

[56] References Cited

U.S. PATENT DOCUMENTS

| 3,058,602 | 12/1962 | Kilman | 414/11 |
| 4,120,484 | 10/1978 | Zimmer | 414/11 |
| 4,369,014 | 1/1983 | Jolivet | 414/11 |
| 4,676,713 | 6/1987 | Voelpel | 414/590 |
| 4,778,329 | 10/1988 | Phillips | 414/589 |
| 4,884,938 | 12/1989 | Fujita et al. | 414/541 |
| 5,259,721 | 11/1993 | Sato et al. | 414/11 |
| 5,297,915 | 3/1994 | Bach | 414/590 |
| 5,397,207 | 3/1995 | Arellano et al. | 414/11 |

FOREIGN PATENT DOCUMENTS

| 1242782 | 12/1959 | France . | |
| 2602622 | 7/1928 | Germany . | |
| 9212775 | 11/1992 | Germany . | |
| 3-176243 | 7/1991 | Japan | 414/11 |

Primary Examiner—Karen B. Merritt
Assistant Examiner—Douglas Hess
Attorney, Agent, or Firm—Nilles & Nilles, S.C.

[57] ABSTRACT

A device for fitting shop windows comprises: a base (100) having wheels, at least two independent vertical lifts (210, 220) secured to the base (100), and a ram (300) supported by the lifts (210, 220) and comprising an axial translator (330). A suction cup structure (500) is arranged on the end of the ram (300) and two independent translators for transversely translating the ram (300) are arranged at the top of the lift (210, 220). A rotator (510, 520, 610, 620) is present for rotating the suction cup structure (500) about the axis (D1) of the ram (300), and about an axis (D2) parallel to the direction of movement of the lift (210, 220).

27 Claims, 17 Drawing Sheets

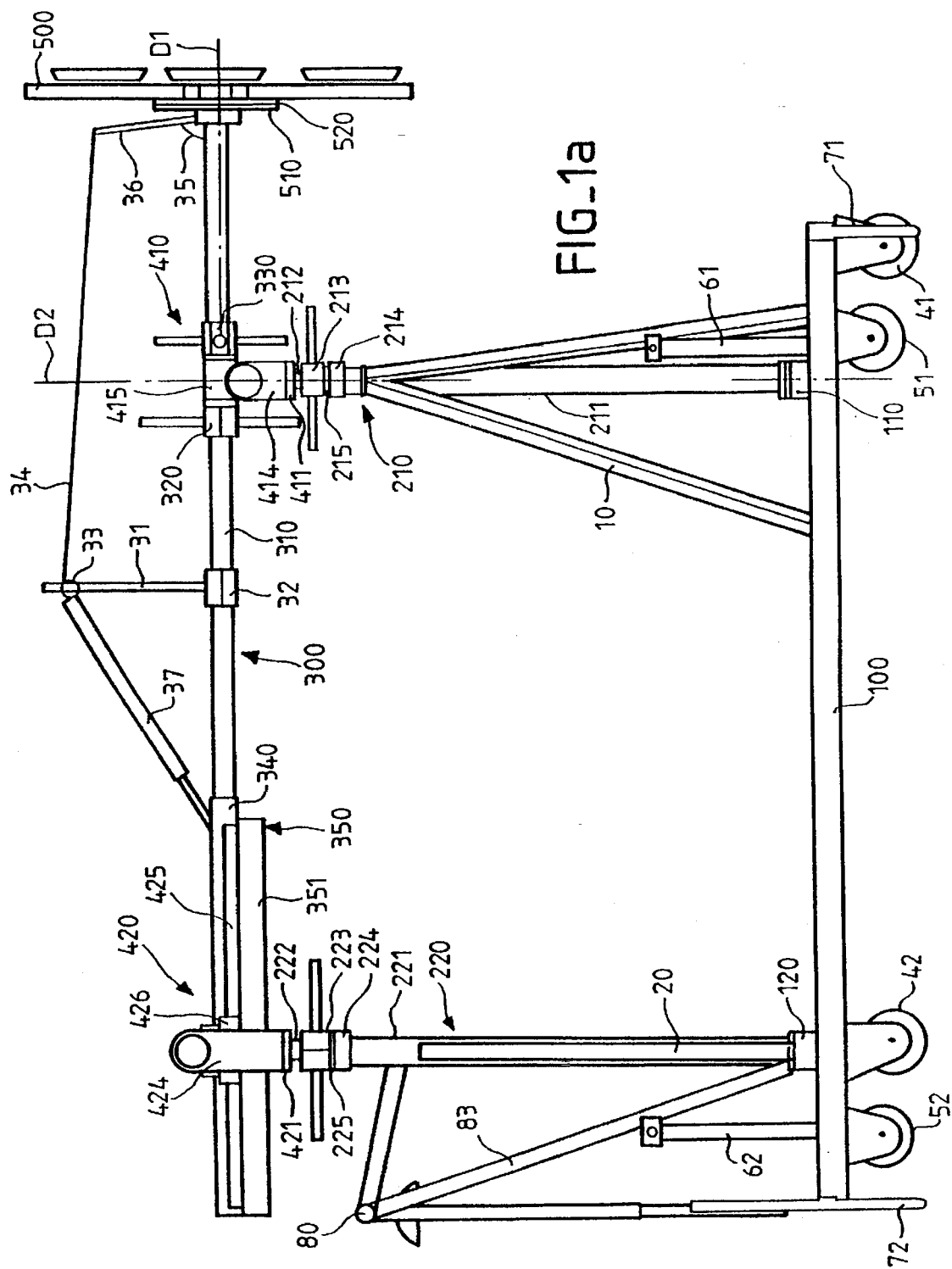

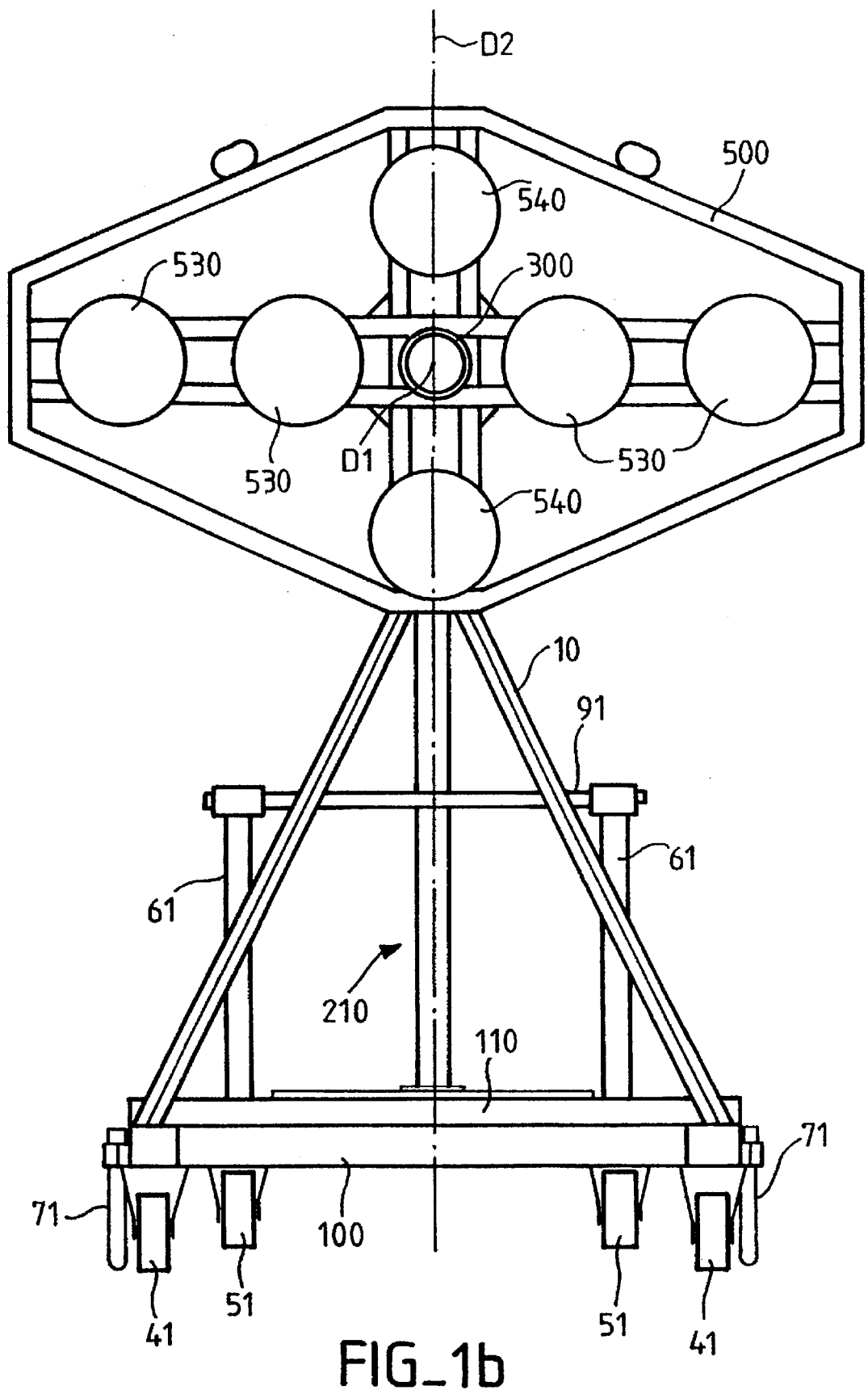
FIG_1b

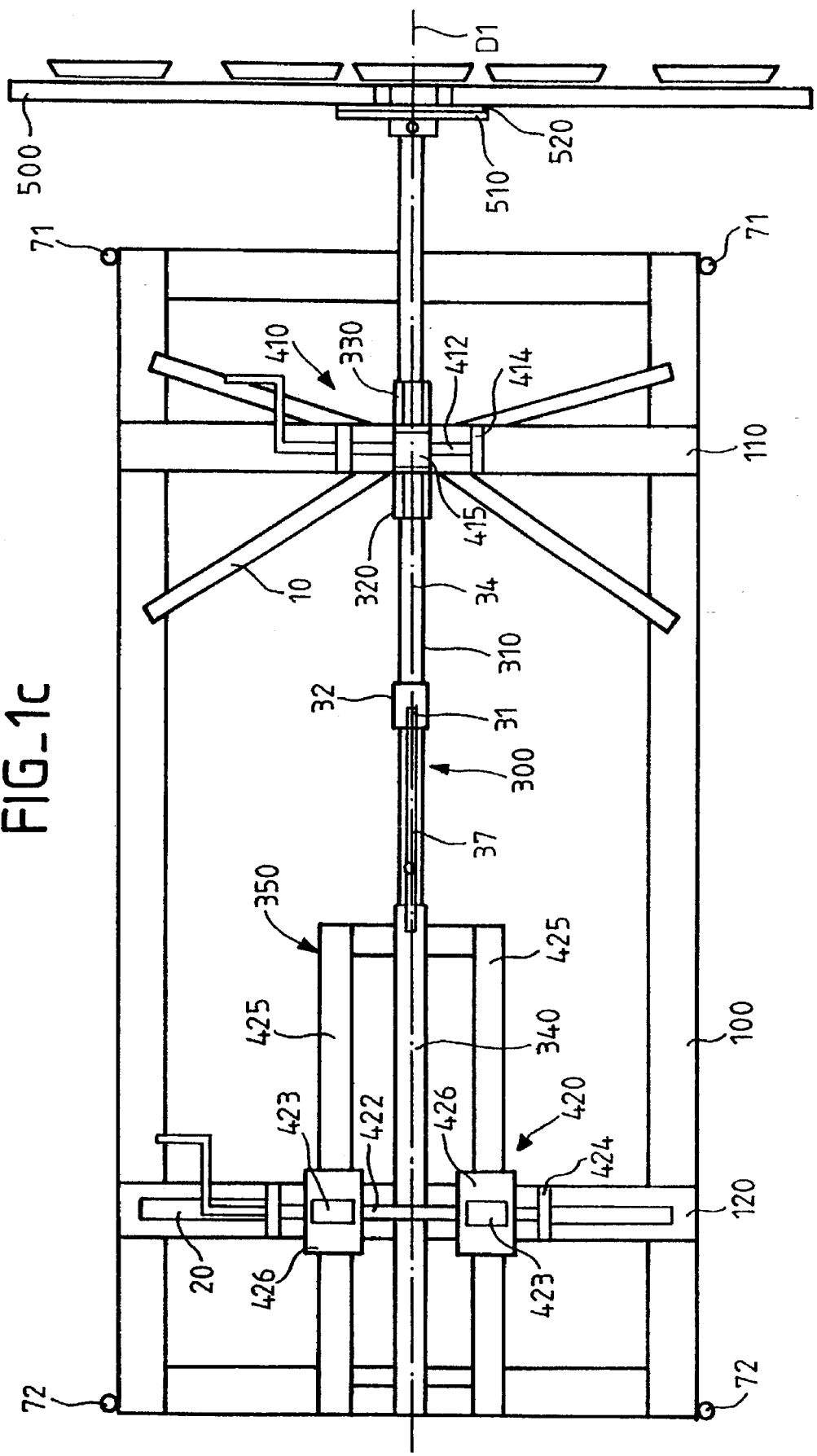
FIG_1c

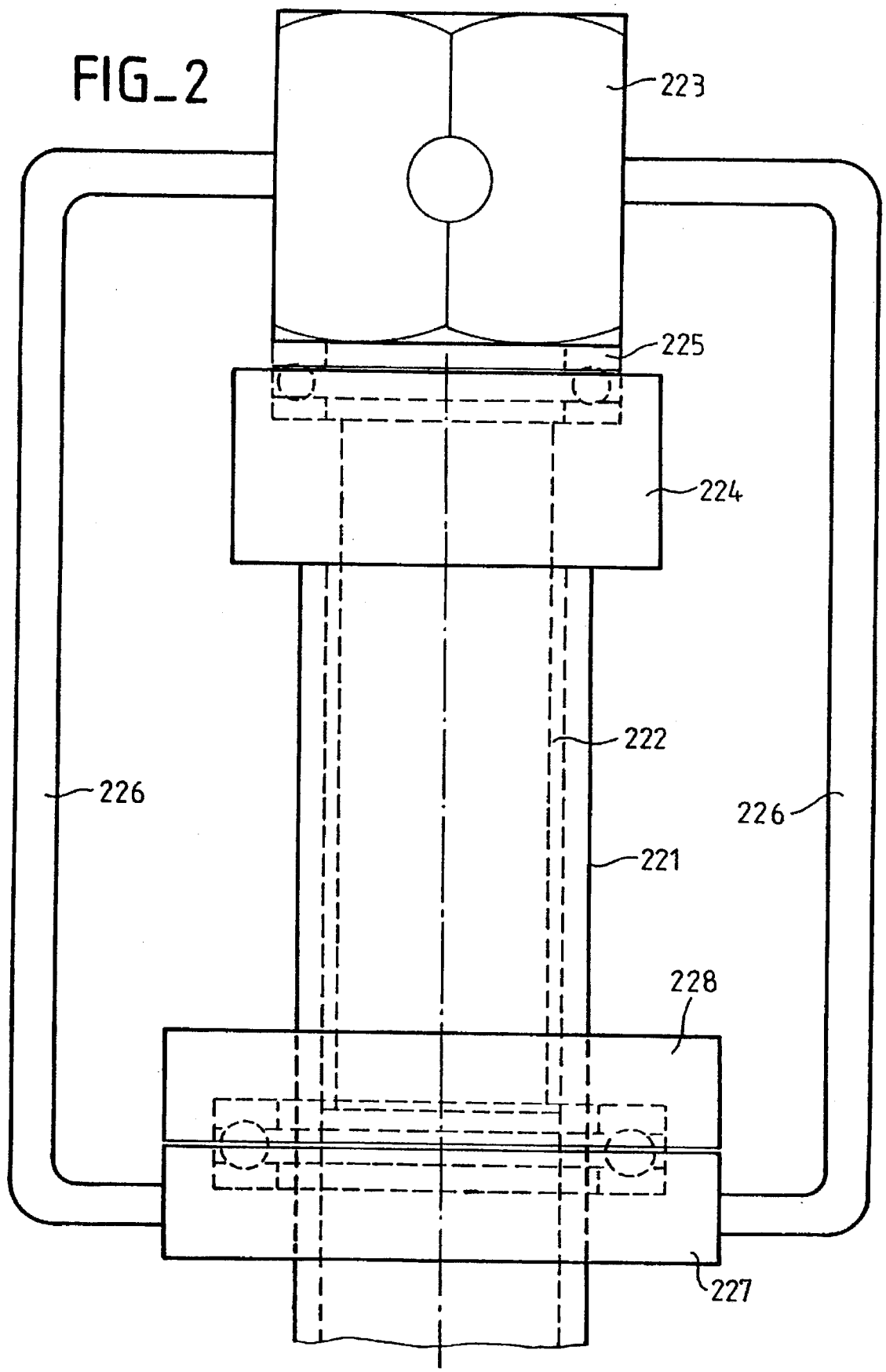

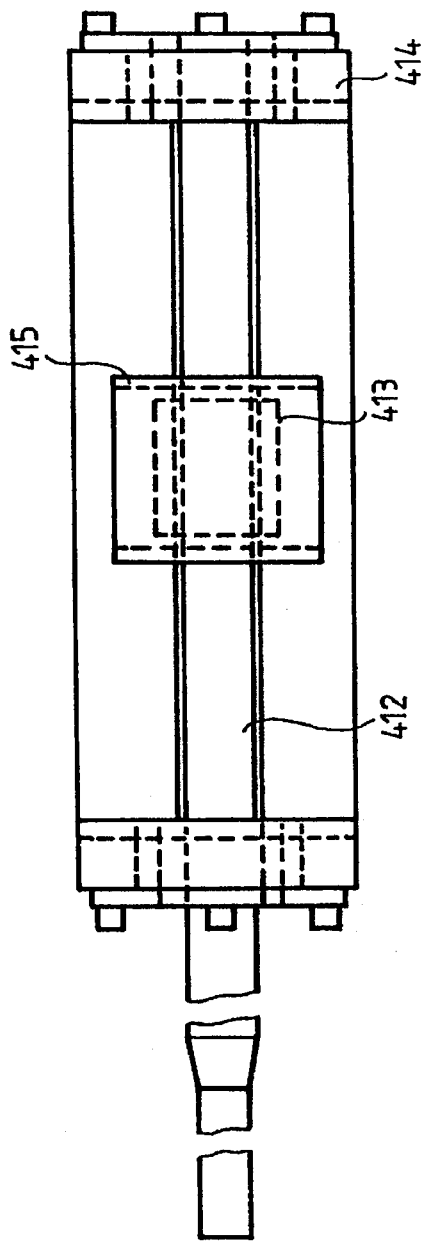
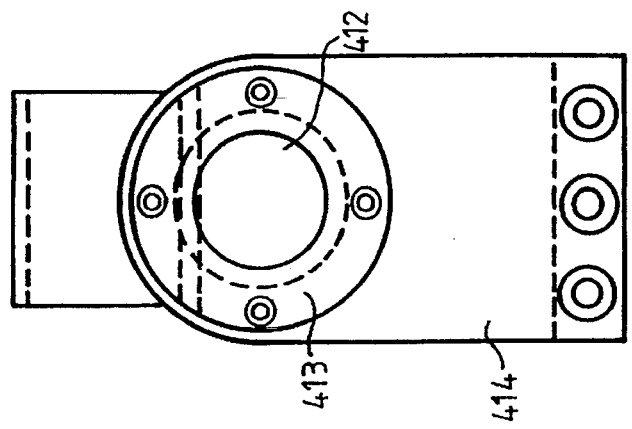
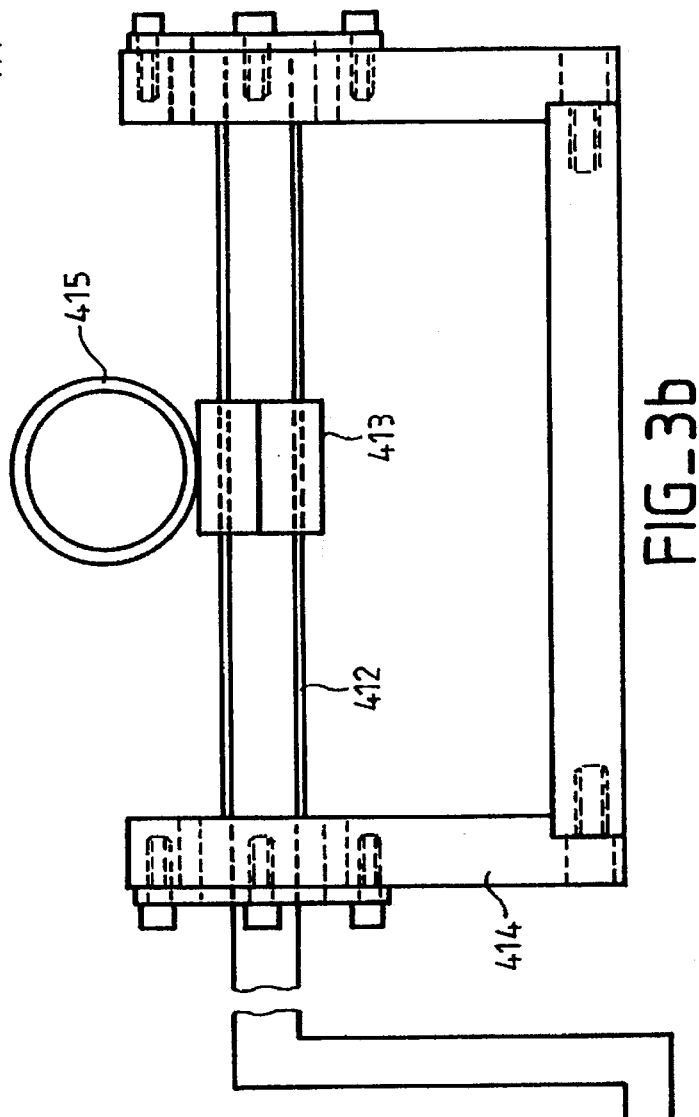
FIG_3a
FIG_3b
FIG_3c

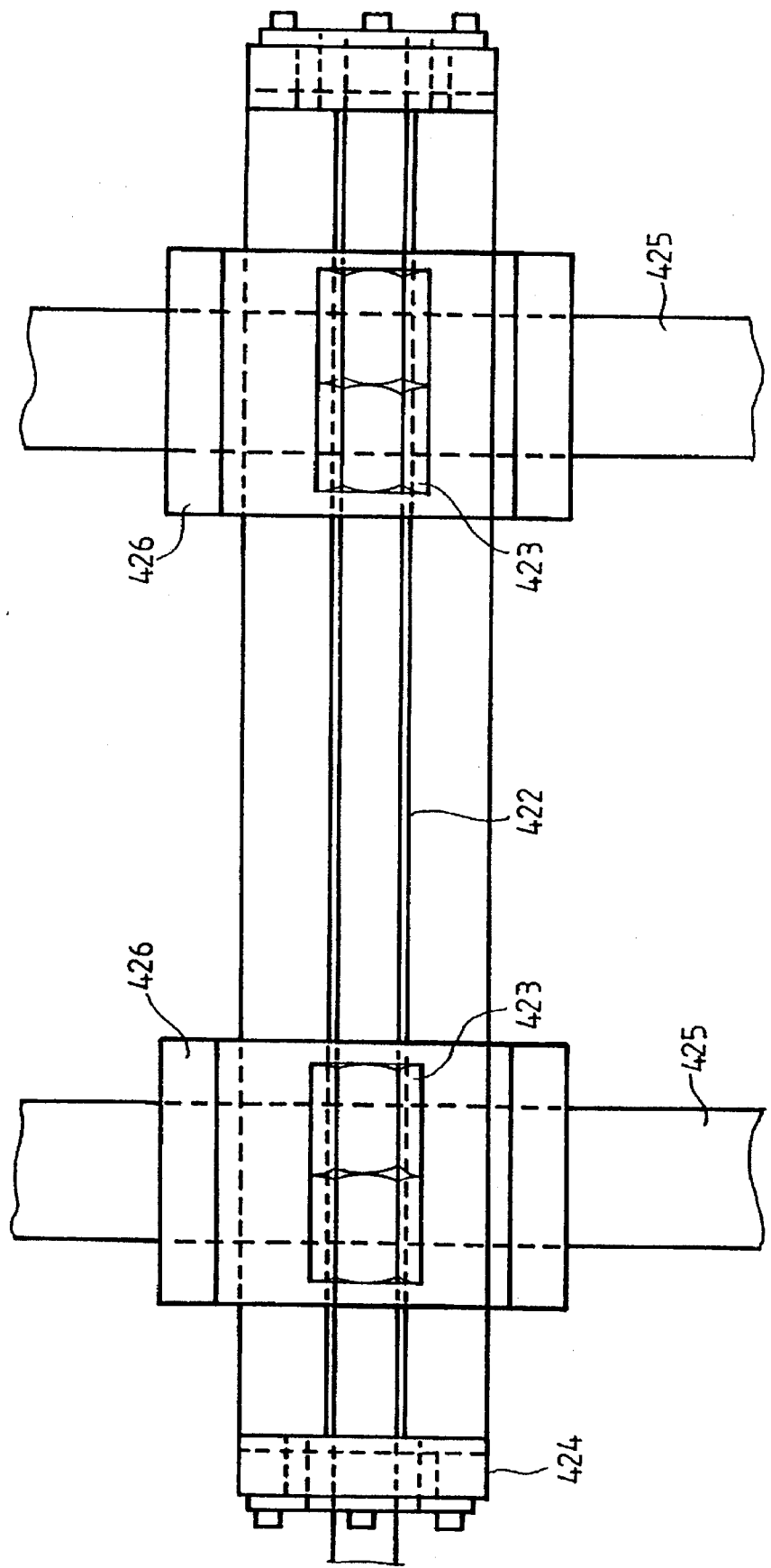
FIG_4a

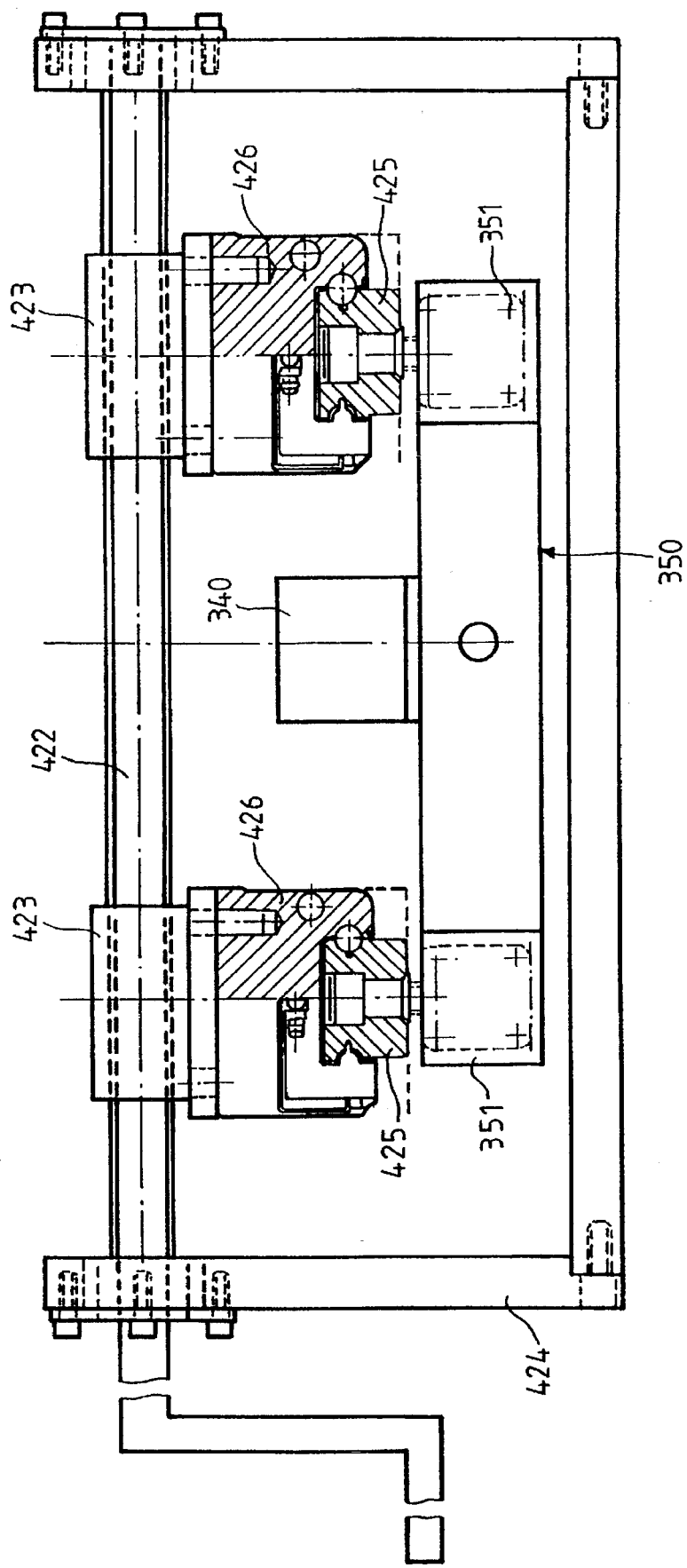

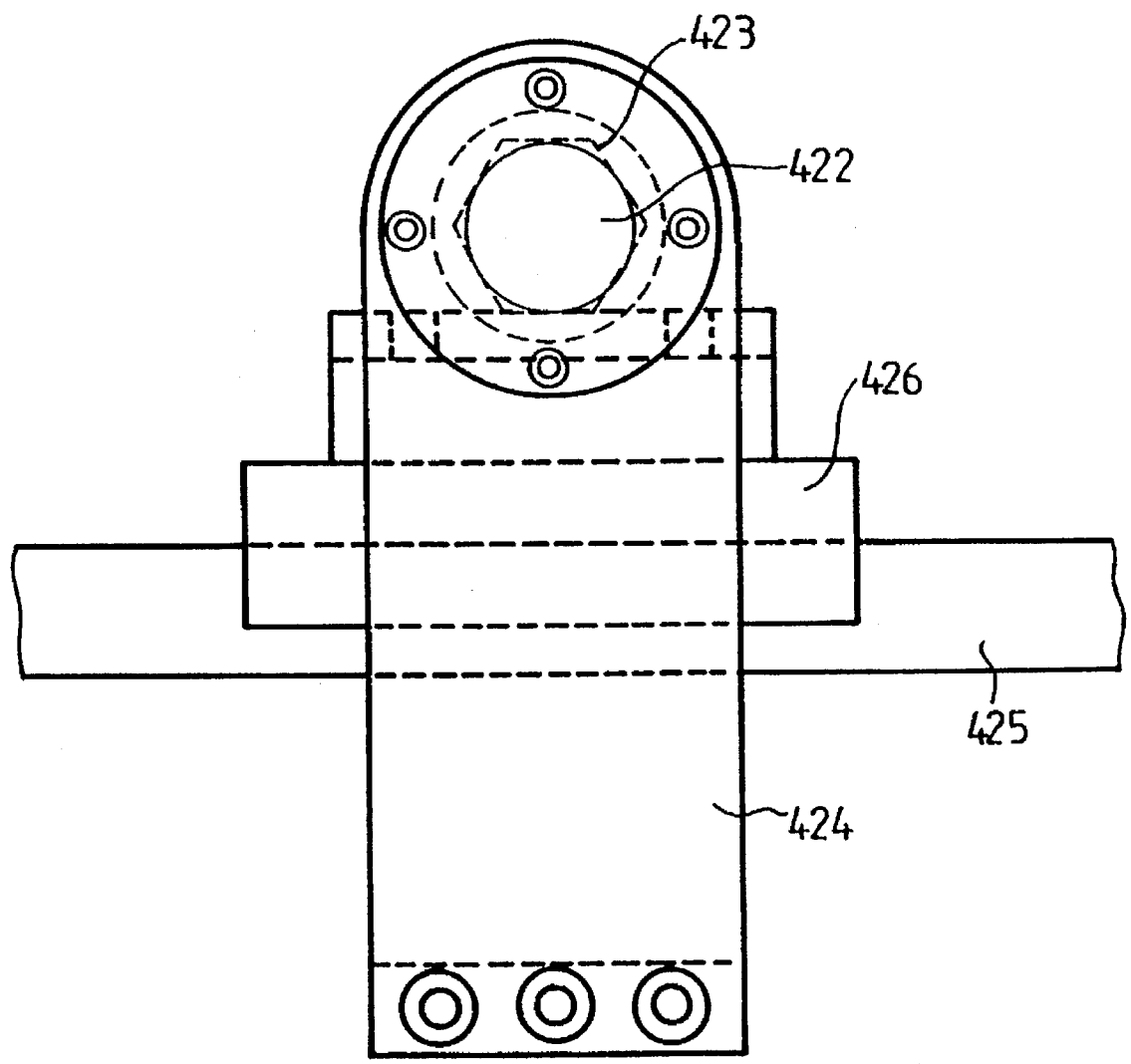
FIG_4c

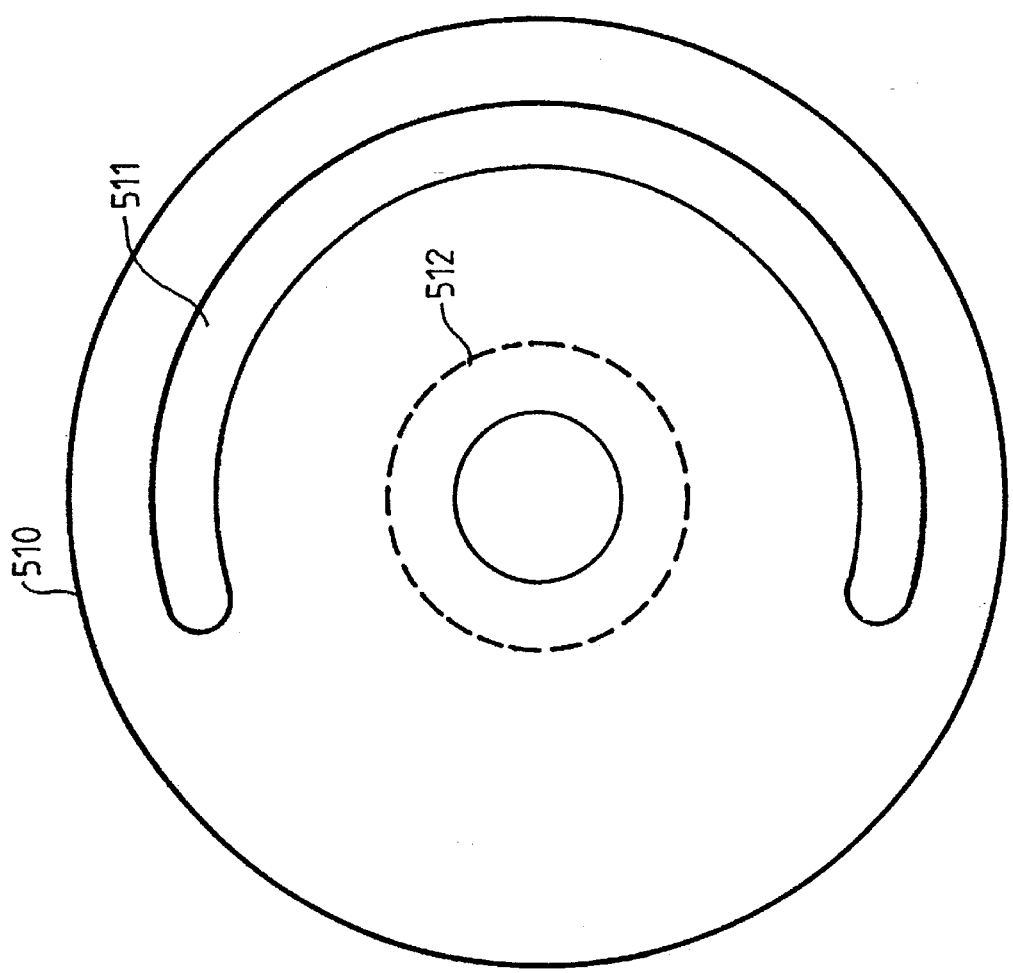
FIG_5a
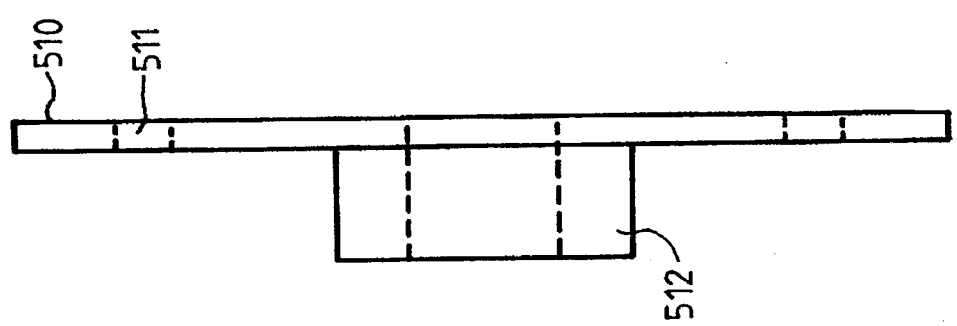
FIG_5b

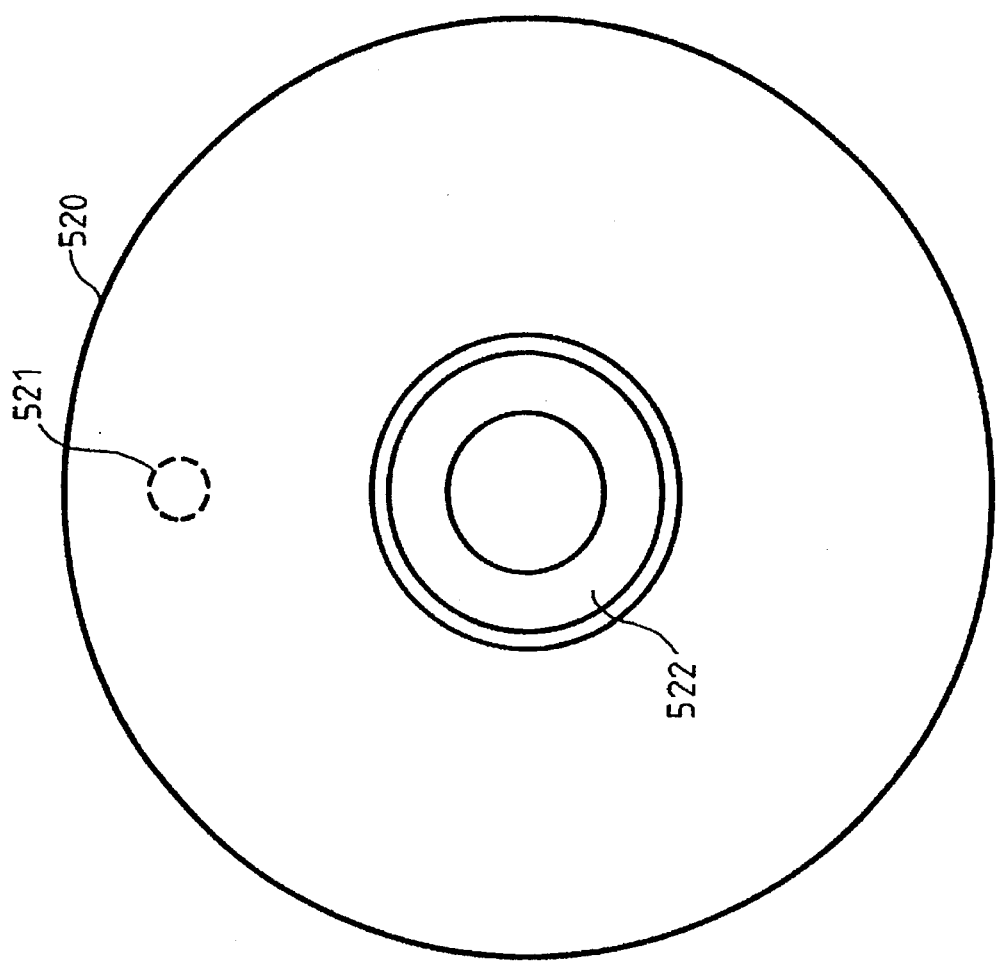
FIG._6a
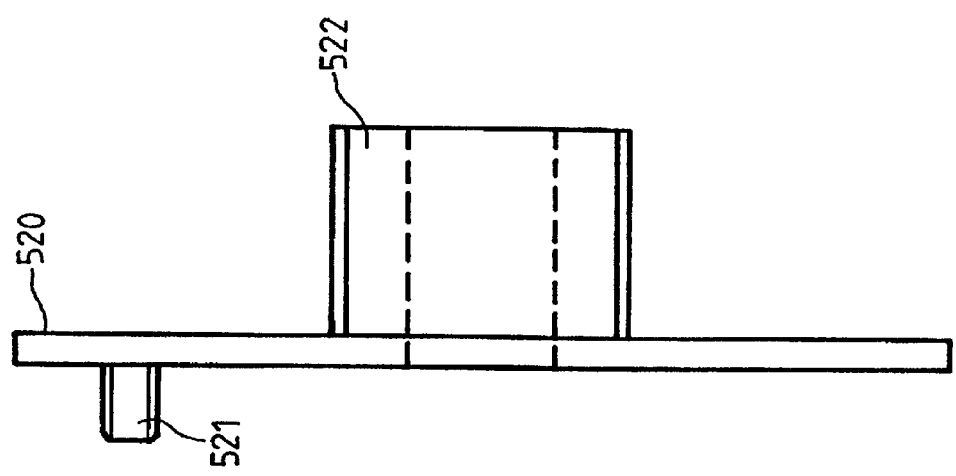
FIG._6b

FIG_7a
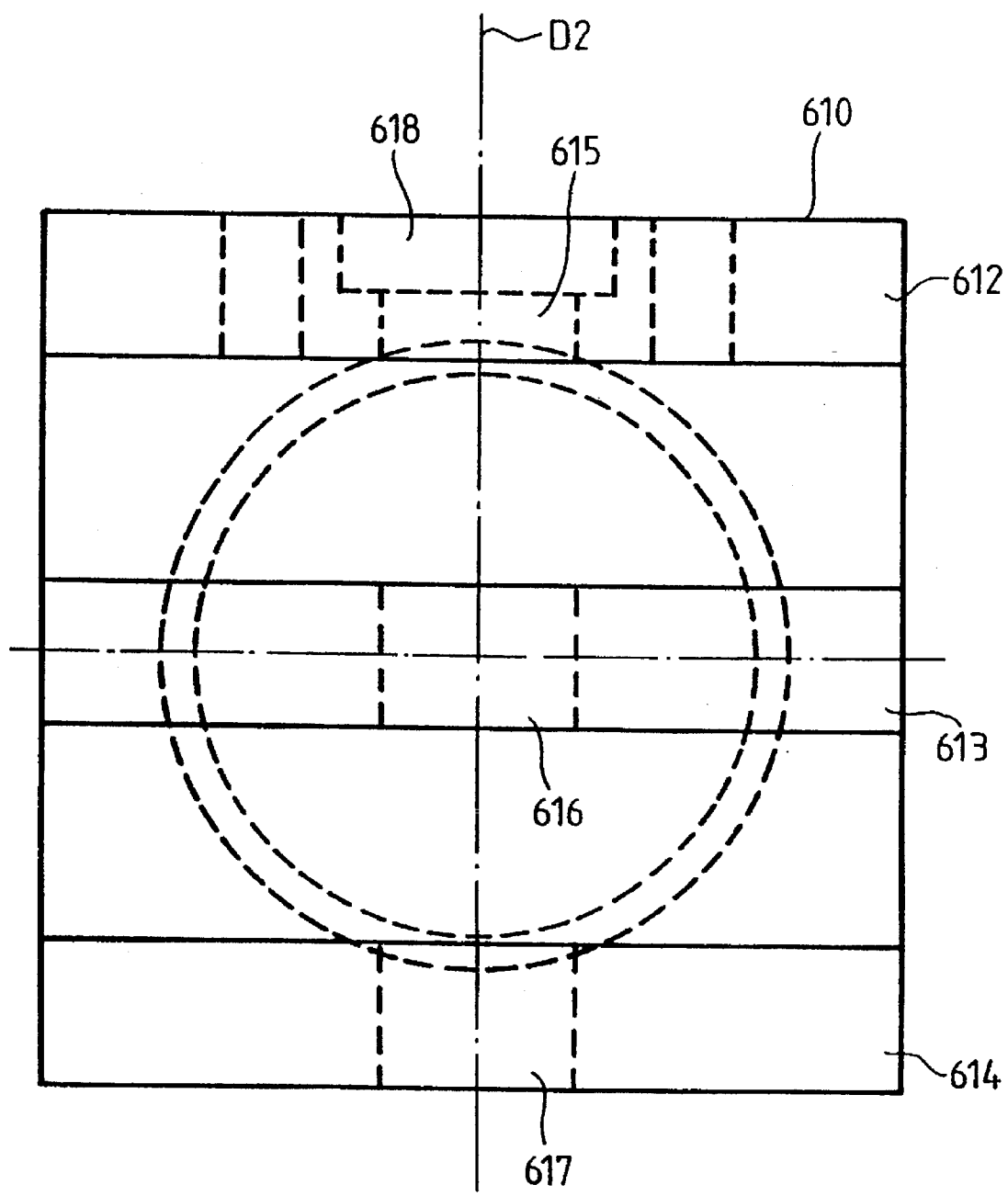

FIG_7b
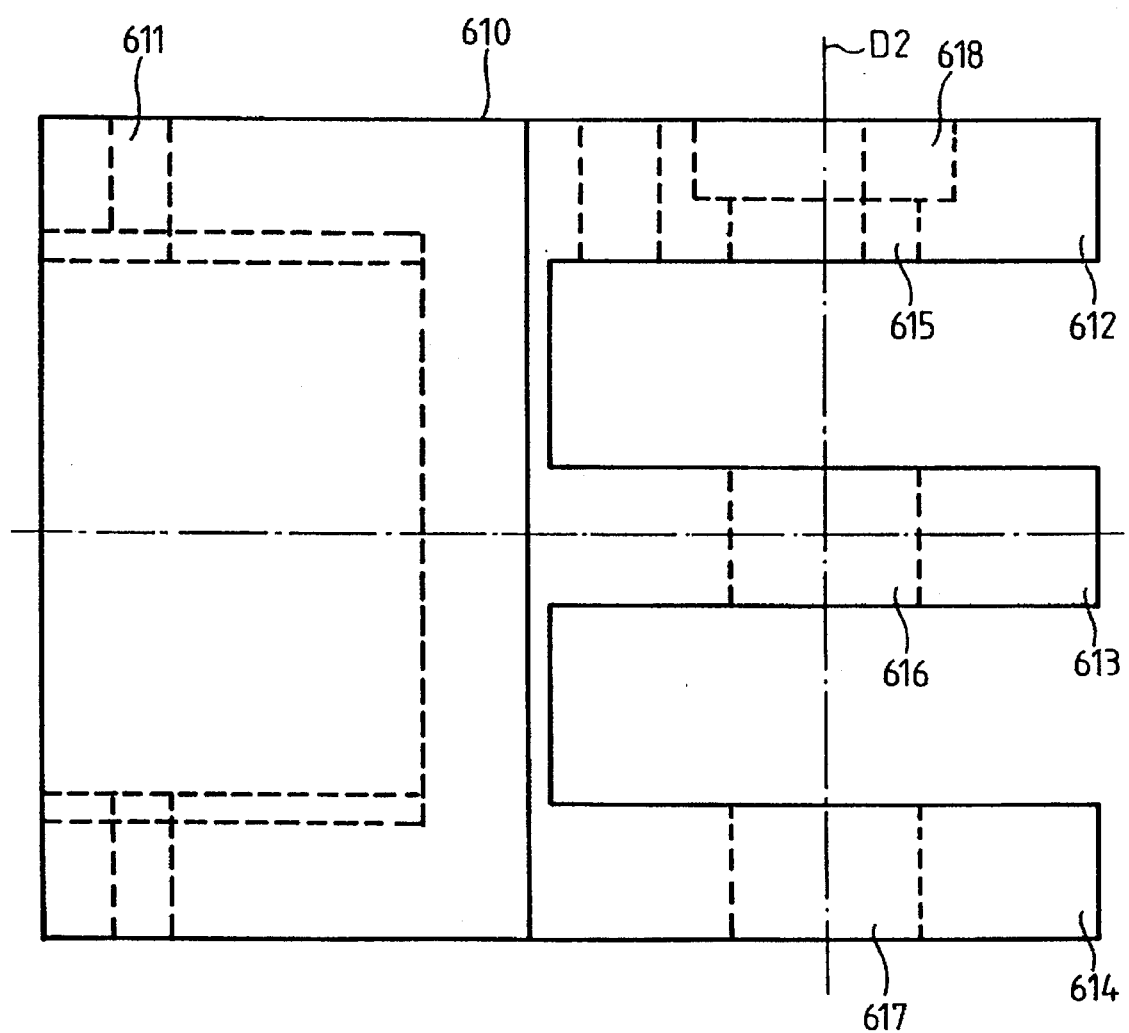

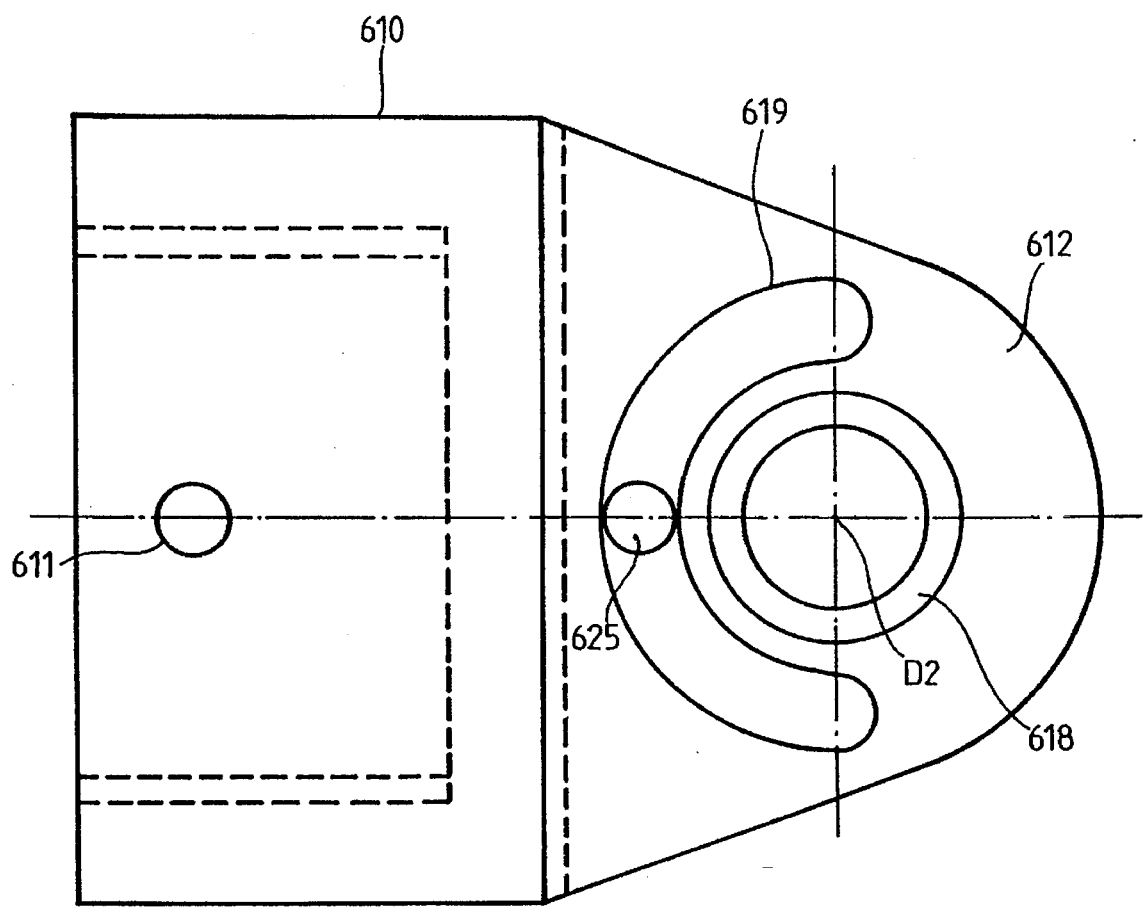
FIG_7c

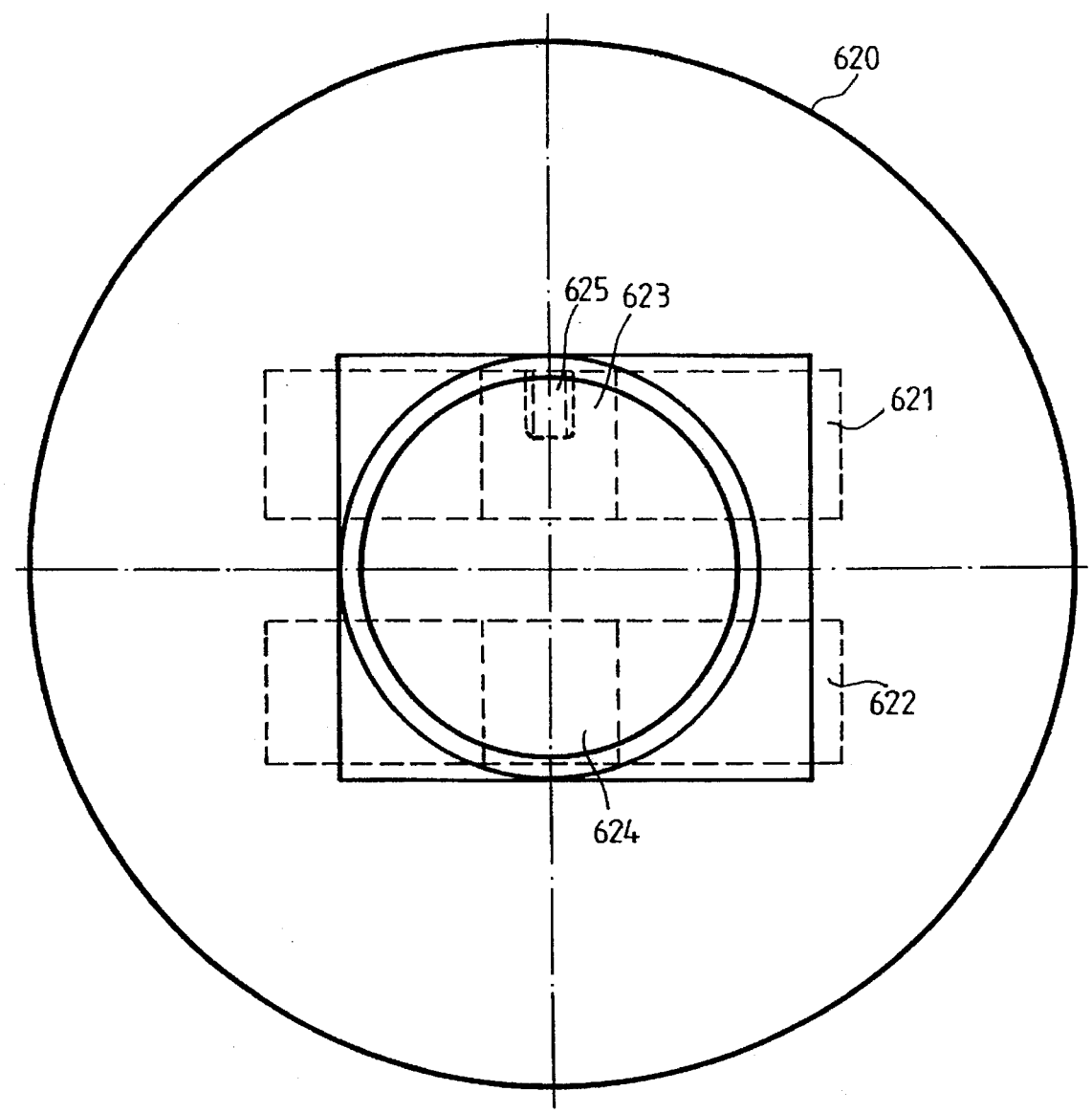

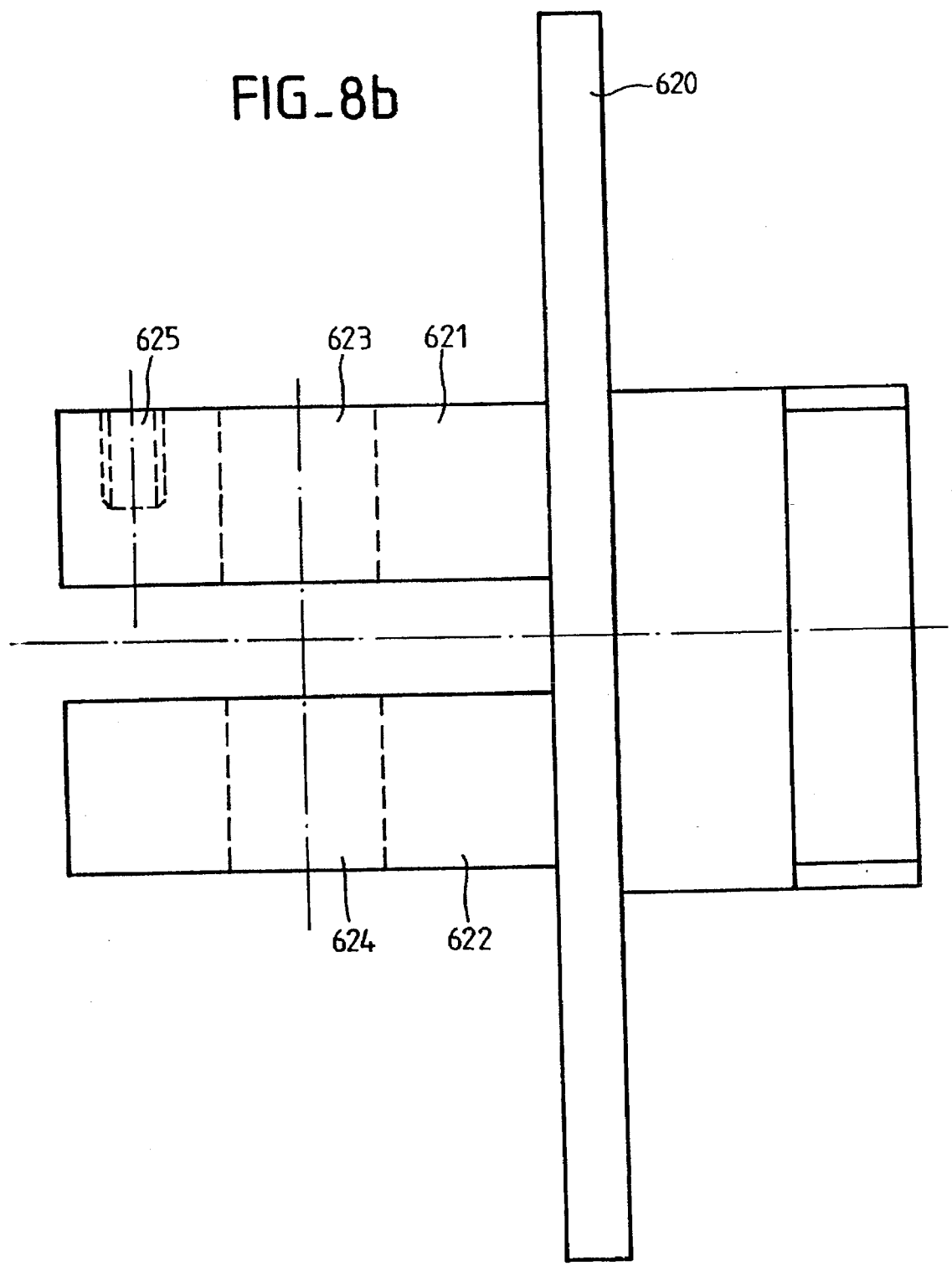

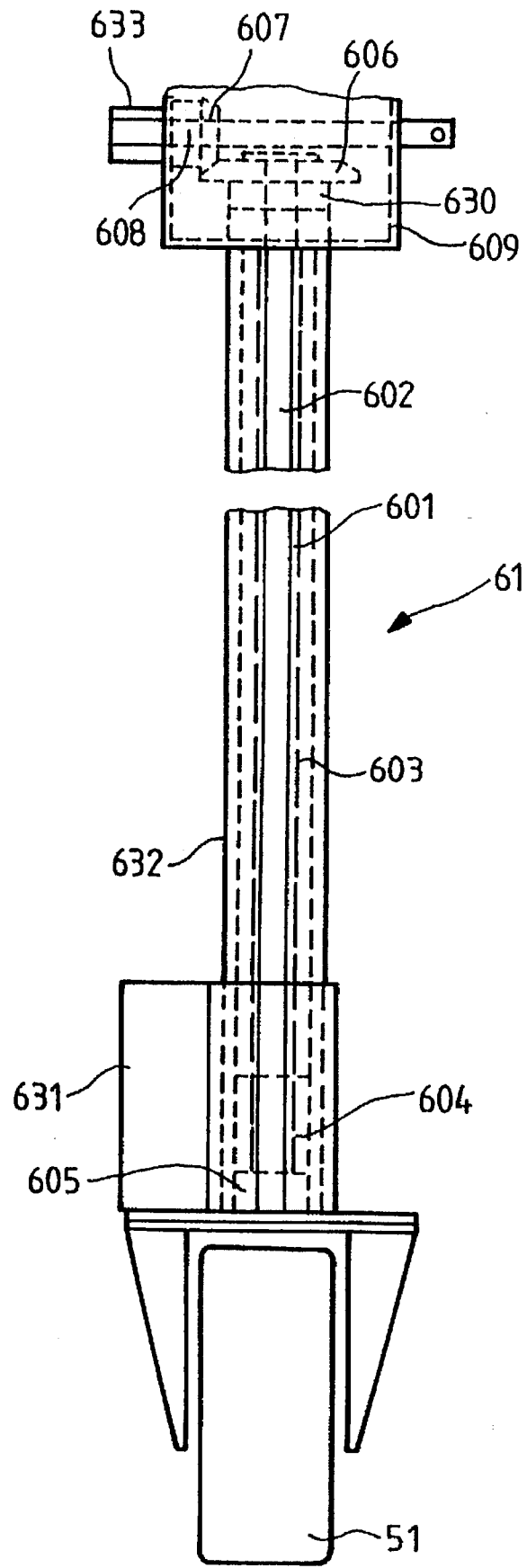
FIG_10

DEVICE FOR FITTING SHOP WINDOWS

BACKGROUND OF THE INVENTION

The present invention relates to a device for fitting shop windows.

A first type of existing device for fitting shop windows consists of a low, narrow cart on four wheels, including two pivoting wheels, enabling a window to be placed vertically inside the cart, the vertical posts of which grip the lower parts of the window while supporting a large portion of the weight. Held manually by two window fitters using vacuum suction means, the window is wheeled towards its frame and positioned in parallel, then hoisted by hand on to previously positioned shims.

There also exist known truck-mounted hydraulic cranes whose motions are of a circular type because of the action of the jacks close to the rotation hubs. These systems therefore cannot be used to bring a window to less than some centimeters from its frame. Furthermore, there can be little control over the precision of the hydraulic motions (through control over the slowness of the starting, stopping and lowering of the tensioned arm).

Apart from this lack of precision in their motions, hydraulic cranes have other drawbacks:

- the need for at least three operators: one at the controls and at least two for fitting at close quarters, depending on the weight of the window,
- difficult, frequent and costly maintenance of the hydraulic systems,
- danger for operators working at close quarters in contact with the glass,
- the need to position two shims that bear the weight of the window on the frame before it is fitted in, subsequently entailing the drawback of difficult and dangerous shim-adjusting operations. The result thereof may be that the windows may crack either through thermal shock or because they have a curvature with respect to the frame that is difficult to correct in each of the two planes,
- the impossibility of using this type of fitting device when there are pavements or steps between the hydraulic machines and the window frames,
- the impossibility also of bringing the window closer because of the upper elbow of the hinged arm of the cranes when there are balconies, projections whose lower part is close to the top of the frames of the windows to be replaced,
- the impossibility, for the crane trucks, of getting close to the frames because of narrow or excessively wide streets, trees and/or urban fixtures that form obstacles to them,
- the need for starting and braking torque values of a kind that no machine has been hitherto able to work with actually and/or durably in submillimetrical motion without the risk of breakage of glass,
- the appearance on these known machines of incipient "return" motions that are also detrimental.

OBJECTS AND SUMMARY OF THE INVENTION

Hence, the aim of the present invention is to overcome the above-mentioned drawbacks by proposing a shop window fitting device that enables work to be done with only one person in all safety and independence, and with all precision and especially with the slowness required when the window is on the verge of being fitted.

This aim is achieved, according to the present invention, by the fact that said device comprises:

- a base provided with roller means,
- two independently operable vertical hoisting means fixed to said base,
- a ram supported by both said hoisting means and comprising axial translation means,
- a suction cap structure positioned at one end of said ram,
- two independently operable translation means for the transversal translation of the ram positioned at the top points of said hoisting means,
- means for the rotation of said suction cap structure, firstly about the axis of said ram and secondly about an axis parallel to the direction of the motion of the hoisting means.

Thus, the device of the invention can be handled by only one hand. Its starting torque is such (less than 15 Newtons) as to enable the performance and control of ascending, transversal or lateral motions of about a quarter of a millimeter.

Advantageously, it is provided in the invention that said hoisting means will each be formed by a vertical mast comprising a worm screw that has its rotation blocked at least at one end and that is movable only in axial translation under the effect of a nut-operated lifting unit.

Similarly, according to a preferred embodiment of the invention, said ram has a worm screw whose rotation is blocked, forming means of axial translation with at least one nut-operated device.

Finally, it is also provided that said independent means for the transversal translation of the ram each comprise a worm screw device perpendicular to the ram, driving at least one nut fixedly joined to said ram in transversal translation.

This mechanical design of the device according to the invention, based on the use of worm screws, for operation in all three dimensions, certain uses being compelled in linear motion, makes it possible to obtain a condition where the vertical motions as well as the horizontal motions work smoothly together in parallel as well as in opposition. It is possible, for example, to produce a circular motion to correct the declivity of roads.

The applicant has estimated that the average time taken to fit a 150 kg window from the point when the device of the invention is presented to the lateral glass-holding structure device of the truck to the instant of the perfect fitting of the window, not counting the fitting of the framing strip, is less than a quarter of an hour under normal conditions.

Of course, the payload may largely exceed the above-mentioned value and reach 400 kg, without causing the device to buckle.

BRIEF DESCRIPTION OF THE DRAWINGS

The following description, made with reference to the appended figures, given by way of non-restrictive examples, will provide for a clear understanding of the content of the invention and of the way in which the invention can be achieved.

FIGS. 1a, 1b and 1c are side, front and top views of a device for the fitting of shop windows according to the invention.

FIG. 2 is a side view of a lift-preventing device for the worm screw of a mast of the device of FIGS. 1a, 1b and 1c.

FIGS. 3a, 3b and 3c are top, side and front views of first means for the transversal translation of the ram of the device of the invention.

FIGS. 4a, 4b and 4c are top, side and front views of second means for the transversal translation of the ram of the device of the invention.

FIGS. 5a and 5b are front and side views of the fixed plate of the means for the rotation of the suction cap structure of the device of the invention about the axis of the ram.

FIGS. 6a and 6b are front and side views of the mobile plate of the means for the rotation of the suction cap structure of the device of the invention about the axis of the ram.

FIGS. 7a, 7b and 7c are front, side and top views of the fixed head of the means for the rotation of the suction cap structure of the device of the invention about a vertical axis.

FIGS. 8a and 8b are front and side views of the pivoting head of the means for the rotation of the suction cap structure of the device of the invention about a vertical axis.

FIG. 10 is a front view of a jack for the handling of the additional wheels of FIGS. 1a and 1b.

DETAILED DESCRIPTION OF THE PREFERRED EMBODIMENTS

Figure 9:
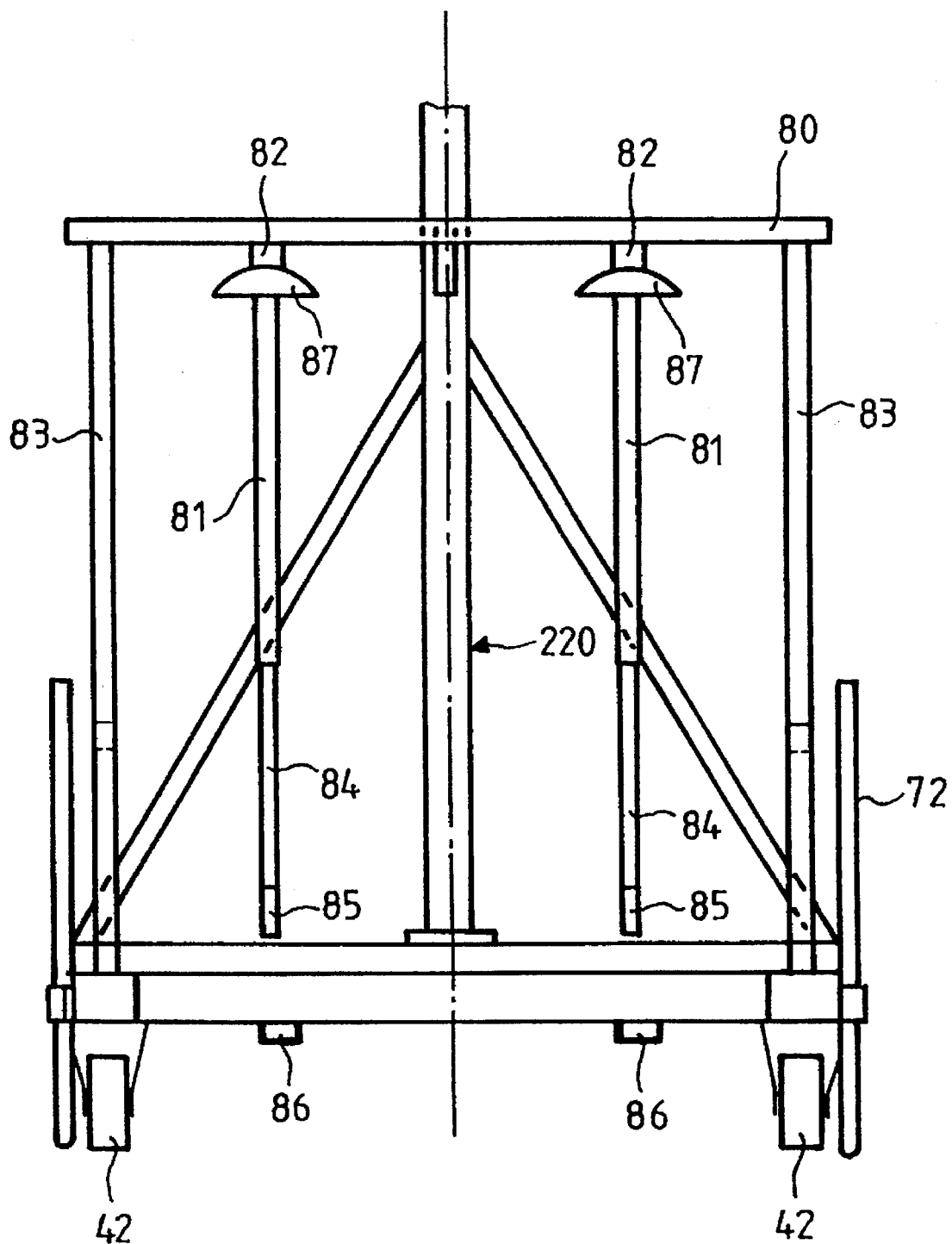
FIG. 9 is a front view of the guidance bar and of the mobile levers for starting the device of the invention.

FIGS. 1a, 1b and 1c show side, front and top views of a device for the fitting of shop windows comprising:

a base 100 provided with roller means 41, 42, two vertical, independent hoisting means 210, 220 fixed to said base 100, a ram 300 supported by said hoisting means 210, and comprising axial translation means 310, 320, 330, a suction cap structure 500 positioned at one front end of said ram 300 with respect to the direction of feed of the device, independent means 410, 420, respectively known as a front tower and a rear tower, for the transversal translation of the ram 300, positioned at the top ends of the hoisting means 210, 220, means 510, 520 for the rotation of the suction cap bearing structure 500 about the axis D1 of the ram 300 and means 610, 620, not shown in FIG. 1a, 1b and 1c, of rotation about an axis D2 which, at rest, is parallel to the direction of motion of the hoisting means 210, 220, namely the vertical direction, and in their axis.

As shown in FIG. 1a, said hoisting means are formed by a front mast 210 and a rear mast 220, these two masts being vertical, each comprising a hollow tube 211, 221 that is welded perfectly vertically to the respective center of bars 110, 120 having the width of the base 100.

The hollow tube 211 of the front mast 210 is buttressed by four square-sectioned irons 10 that descend from the top of the mast towards the lengths of the base 100 in the shape of a pyramid, but have a rectangular base. In the rear, two square irons 20 go beneath the top of the hollow tube 221 towards the lengths of the base 100 and perpendicularly to the axis D1 of the ram 300.

Each of the masts 210, 220 ends in a strictly horizontal section into which there penetrates, with a perfect fit, a sleeve 214, 224 whose upper part is widened and slightly raised and receives a ball thrust bearing 215, 225, namely a flat ball bearing.

In each of the hollow tubes 211, 221 of the masts 210, 220, a single-thread precision worm screw 212, 222 is inserted without any clearance, and is mounted so that any motion or incipient motion of rotation is stopped at one end at least of said screw. To this end, for example, the upper ends of said worm screws are fixed to a plate 411, 421 respectively bearing the independent means 410, 420 for the transversal translation of the ram 300.

Above the sleeve 214, 224 and the corresponding ball thrust bearing 215, 225, the upper part of each worm screw 212, 222 receives a nut-operated lifting unit 213, 223 provided with two iron shafts welded on either side of these nuts and used as operating handles. The nuts 213, 223 are laid on the upper part of the ball thrust bearing 215, 225 forming a supporting surface.

Thus, since the worm screws 212, 222 cannot pivot on themselves, the putting into rotation of the nut-operated lifting units 213, 223 obliges these worm screws to undergo only one motion of axial translation, upwards and downwards as desired. The relative motions of one mast with respect to the other can be done in parallel or in opposition, at the desired speed and practically without any clearance.

The base of each worm screw 212, 222 has limit stop means formed by a projecting element such as a metal cross (not shown) welded to the lower end of said worm screws. At the end of travel, said cross abuts the lower edge of the sleeve 214, 224 located within the hollow tube 211, 221. The metal crosses are also used as guides for the axis of the worm screws 212, 222 in their translation motion and enable the prevention of any clearance in the hollow tubes 211, 221.

FIG. 2 shows a lift-preventing device prepared in the rear mast 220, designed to prevent any motion of the worm screw 222 outside the hollow tube 221 when the window to be fitted has a major weight.

This lift-preventing device has, firstly, a ring 227 that is mobile along the hollow tube 221, fixedly joined to the worm screw 222 by two rods 226 welded to the nut 223 and, secondly, a fixed ring 228 welded to the hollow tube 221, forming a stop for said mobile ring 227 in the event of a lifting of the worm screw 222.

According to FIGS. 1a and 1c, the ram 300 has means in front for joining with the suction cap structure 500 that shall be described in detail further below.

The central part of the ram 300 is formed by a worm screw 310 whose rotation is blocked, as is the case with the worm screws 212, 222 of the masts. To do this, the rear end of said worm screw 310 is force-fitted into a square-sectioned hollow tube 340 fixed to a cradle 350. In practice, said hollow tube 340 is sectioned in its middle and then, after the worm screw 310 has been fitted into it, the two parts of the tube are mechanically welded.

The worm screw 310, with two nut-operated devices 320, 330 provided with two iron rods used as handles, forms means for the axial translation of the ram 300 frontwards as well as towards the rear. Said nut-operated devices 320, 330 are positioned on either side of the front tower 410 and may be used either for the axial translation of the ram 300 or to block said ram in an axial position.

Ultimately, the worm screw 310 of the ram works exactly the same way as the worm screws 212, 222 of the hoisting means 210, 220: the rotational motion of the nut-operated devices 320, 330 gives rise to a translational motion of the worm screw owing to the fact that the rotation of this screw is blocked by the hollow tube 340 fixed to the fixed cradle 350.

So as to prevent any deflection of the ram 300 under the effect of a major load or when it is sought to work at the end of the range in front, there is provision for a deflection-preventing device comprising a median vertical rod 31 fixedly joined to a nut 32 fixed to the worm screw 310 by a pin. Said rod 31 bears a pulley 33 on which there passes a cable 34 connected at one end to said square-sectioned tube 340 and at another end to a second rod 36 fixed by a prop 35 to the end of the worm screw 310 of the ram 300, bearing the suction cap structure 500. The cable 34 may be adjusted by means of a tensioning device 37 that converts any deflection of the ram 300 into compression at its core and tension in this cable. This bending preventive device therefore enables operation in full safety even under heavy load.

In general, the front tower 410 and the rear tower 420, forming the independent means of transversal translation that control the yaw axes motion of the ram 300, each have a worm screw device 412, 422 with a handle, perpendicular to the ram 300 and driving at least one nut 413, 423 fixedly joined to said ram in translational motion with respect to the axis D1 of the ram 300. The worm screws 412, 422 therefore work in reverse to the above-mentioned worm screws described with reference to the masts 210, 220 and the ram 300. In the case of the two towers 410, 420, the worm screws are free to rotate about their axis while the nuts 412, 423, on the contrary, have their rotational motion blocked. This prompts their axial shifting along the worm screws on which they are mounted.

The worm screw device 412 of the front tower 410 shown in detail in FIGS. 3a, 3b and 3c is borne by a U-shaped frame 414 fixed to the plate 411 in which the worm screw 212 of the front mast 210 is kept blocked in rotation.

The horizontal worm screw 412 of the front tower 410 receives a nut 413 to which there is mechanically welded a tube portion 415 having two precision sleeves, not shown, the internal diameter of which is 1/10 mm wider than that of the ram 300 that they receive. This assembly is kept permanently positioned upwards.

In the same way, the worm screw device 422 of the rear tower 420 shown in FIGS. 4a, 4b and 4c is borne by a U-shaped frame 424 fixed to the plate 421 in which the worm screw 222 of the rear mast 220 is kept blocked.

On the handle-fitted worm screw 222 of the rear tower 420, two double nuts 423 are mobile. These nuts 423 drive the cradle 350 in transversal translation with respect to the axis D1 of the ram 300 which is force-fitted at the rear into the square hollow tube 340 fixed to said cradle. The link between the nuts 423 and the cradle 350 is obtained by means of two parallel rails 425 mounted on longitudinal uprights 351 of the cradle 350 and sliding in parallel to the axis D1 of the ram 300 in two suspension elements 426 respectively fixed to said double nuts 423. This assembly is kept permanently fixed downwards.

The various rotational motions of the suction cap structure 500 shall now be described with reference to FIGS. 5a to 8b.

The means for the rotation of said suction cap structure about the axis D1 of the ram 300 comprise, borne by said ram, firstly a first fixed circular plate 510 held fixedly on the ram 300 by means of a pin and provided with a central hub 512 and a circular slot 511 along 210°, and secondly, a second plate 520 that is mobile, freely fitted into the ram 300 by a hub 522 fixedly joined to said suction cap structure and bearing a right-handed screw 521 capable of shifting without clearance in the slot 511 of the fixed plate 510.

The rotational motion of the windows thus obtained is made necessary by the declivity of the roads with respect to the frame of the windows. Furthermore, this motion enables a 90° rotation upwards or downwards allowing the windows to be tilted so that they can be cut out on the pair formed by the device and the truck.

Should it be the case that the device of the invention and its window cannot be presented perpendicularly to the plane of the frame because of urban fixtures or various obstacles, it has to be possible to pivot the suction cap structure 500 about a vertical axis D2. To this end, a head 610 screwed into the mobile plate 520 and fixedly held by a pin 611 bears means for the hinging of a pivoting head 620 joined to the suction cap structure, formed by three horizontal plates 612, 613, 614 positioned in the form of an E and drilled with circular holes 615, 616, 617 having an axis D2.

The pivoting head 620 on which the suction cap structure is fixed has two horizontal plates 621, 622 that get perfectly fitted between the horizontal plates 612, 613, 614 of the head 610. Circular holes 623, 624 drilled in the two horizontal plates 621, 622 are positioned to coincide with the holes 615, 616, 617 so that it is possible to introduce a stud whose head takes support on and is completely inserted into a cavity 618 of the upper horizontal plate 612 of the head 610. Since the axis of said stud is the same as the axis D2 of rotation, the pivoting head 620 may rotate about this axis.

In order to hold the pivoting heads 620 fixedly in position on the head 610, the upper plate 612 of said head bears a circular slot 619 along 150° that is concentric with the axis D2. Facing this circular slot 619, the upper plate 621 of the pivoting head 620 is drilled with a tapped hole 625 enabling the insertion of a locking screw capable of being clamped against the upper plate 612 of the head 610.

As indicated in FIG. 1b, the suction cap structure 500 is formed by a set of bars forming a diamond. Four suction caps 530 are positioned along the large diagonal of said diamond while other suction caps 540 are placed along the small diagonal.

Furthermore, in order to increase the range of the suction cap structure, there is provision for three removable suction caps, two of which are positioned at the ends of the large diagonal of the diamond and one at one end of the small diagonal of the diamond.

The diamond shape of the suction cap structure enables the fitting of tall and narrow windows and even of Securit type doors.

FIGS. 1a, 1b and 1c show that the base 100 is formed by a rectangular frame that bears roller means formed by two non-pivoting front wheels 41 welded to the front of the device and two brake-operated pivoting rear wheels 42 welded to the rear of the base.

Behind the front wheels 41, there are additional non-pivoting front wheels 51 on a jack 61. This is also the case in the rear, with additional pivoting wheels 52 mounted on a jack 62. The jacks 61, 62 may, for example, be truck jacks.

The pairs of additional wheels 51, 52 enable the mounting of pavements or of other types of obstacles.

As can be seen in FIG. 10 pertaining to the jack 61, each of said jacks is formed by a worm screw 601 positioned in a cylindrical grooved tube 602 provided with a longitudinal aperture 603. The worm screw receives two cylindrical nuts 604 welded to each other and calibrated with precision to the internal diameter of the tube 602 minus one millimeter. The lower part of the worm screw 601 is housed in a bearing 605 fixedly joined to the tube at its base. The upper part of the worm screw goes beyond the grooved tube 602 and, at its top, has a bevel gearwheel 606.

Said gearwheel 606 receives a conical and horizontal driving toothed wheel 607 that is crossed, at its center, by a shaft 608 that gets inserted into a small box 609 mechanically welded to the top of the cylindrical and grooved tube 602. The conical toothed wheel 606 at the top of the worm screw 601 is positioned on a ball thrust bearing 630. The lower part of the tube 602 is provided with a welded plate 631 that is fixedly joined to the frame of the wheel 51 at its center.

A grooved cylindrical sleeve 632, force-fitted with precision into the cylindrical tube 602 and welded to the base of the device on at least two axes is used for the necessary guidance when the jack is raised and lowered.

The horizontal rod gearing of each of the jacks is provided with a hexagonal head 633 positioned towards the left and right exterior of the device so that the jacks can be put into motion by means of a movable handle.

Each of the pairs of front jacks 61 and rear jacks 62 furthermore has an shaft such as 91 in FIG. 1b provided with a clutch mechanism with two pins, each at one end. These pins (not shown) enable the activation of the jacks simultaneously or separately. This shaft gets fitted on to the two small shafts 608 for putting the jacks into motion.

At the four ends of the base 100, there are front locking screws 71 and rear locking screws 72. These locking screws are inserted into nuts welded to the base. Their lower edge is rounded and the upper edges have a screw welded to them known as an Allen screw, so that they can be handled speedily and easily. Furthermore, these locking screws 71, 72 enable the device to be raised to the left and to the right and therefore, in combination with the motions described here above, they enable the positioning of a window whose framing strips are on the inside.

FIGS. 1a and 1b indicate that behind the base 100 and at the rear mast 220, a horizontal guidance bar 80 is mechanically welded to the lengths of the base 100. Its uprights 83 have a slight rearward tilt and, furthermore, the center of this horizontal guidance bar is welded beneath the upper part of the rear mast 220 in a longitudinal buttressing position. This assembly has the function of guiding the motion of the device. This system is sufficient to start and guide the device under load in all simple cases.

But in the event of difficulty in starting due to a very heavy load with a slope to be climbed and/or when the rear pivoting wheels 42 are not yet in the desired axis, the starting torque is high.

Hence, the rear horizontal guidance bar 80 uses magnets 82 to support the mobile levers 81 for starting under heavy load and for emergency braking.

These two levers 81 end in cylinders 84 made of solid iron beneath which dense rubber sleeves 85 are fixed.

The solid iron cylinders 84 go into cylindrical rings 86 used as guides by non-static supporting points. They are mechanically welded to the front of the end rear bar of the base 100.

Thus, by a simple gesture with each hand the mobile guidance levers 81 are released from their upper magnetized attachment and are used as starting levers both longitudinally in the event of a slope and circularly when the pivoting wheels 42 are not in the desired axis of rotation and/or translation.

Beneath the magnets 82 of the levers 81, the operator's hands are protected by hollow trunions 87 fixed to the levers which, in addition to their protective function, are used for emergency braking.

Several variants of the window-fitting device that is an object of the invention may be envisaged:

a device with four lateral masts fixed to the longitudinal bars of the base, each bearing a worm screw. The tops of these masts are connected to one another by perpendicular plates in the direction of feed of the device, and on these plates there are placed the front and rear towers. This variant has the advantage of being capable of crossing small obstacles constituted by urban fixtures such as flower pots, parking posts etc., a device made of two independent parts each having a base with four wheels, these parts being connected by a ram. The advantage of this device is that it provides for a shorter turn, a device whose wheels are replaced by tracks also in order to obtain, for equal stability, a shorter turn, a device whose motions could be motorized by means of conical gears, global screws or other devices replacing nut-operated handles, a device mounted on a lifting table or any other vehicle capable of hoisting it heightwise in total safety.

I claim:

1. A device for fitting shop windows, characterised in that said device comprises:

a base provided with roller means, two independently operable vertical hoisting means fixed to said base, a ram supported by both said hoisting means and positioned at a top point of each hoisting means, the ram comprising axial translation means, a suction cap structure positioned at one end of said ram, two independently operated translation means for transverse translation of the ram with respect to the ram's longitudinal axis, means for rotating said suction cap structure, firstly about the axis of said ram and secondly about an axis parallel to the direction of the vertical motion of the hoisting means.

2. Device according to claim 1, characterized in that said hoisting means are each formed by a vertical mast comprising a worm screw that has its rotation blocked at least at one end and is movable only in axial translation by a nut-operated lifting unit.

3. Device according to claim 2, characterized in that said worm screw of each mast is inserted into a hollow tube fixed at a first end to the base of the device and terminated at a second end by a surface for supporting of said nut-operated lifting unit.

4. Device according to claim 3, characterized in that said supporting surface is constituted by a sleeve fitted into said hollow tube and bears a ball thrust bearing.

5. Device according to claim 4, characterized in that said worm screw is provided with an end-of-travel stopping means.

6. Device according to claim 5, characterized in that said end-of-travel stopping means are constituted by a projecting element positioned at the base of the worm screw and designed to abut said sleeve and to be used as a guide for the axis of said worm screw.

7. Device according to claim 6, characterized in that said projecting element is a metal cross welded to said base of the worm screw.

8. Device according to claim 3, characterized in that at least one mast has a device to prevent the lifting of the worm screw and designed to prevent any movement of the lifting of said worm screw out of the hollow tube.

9. Device according to claim 8, characterized in that said lift-preventing device has a mobile ring along the hollow tube, fixedly joined to the worm screw, and a fixed ring on said hollow tube, forming a stop for said mobile ring in the event of the lifting of said worm screw.

10. Device according to claim 1, characterized in that said ram comprises a worm screw forming said axial translation means, whereby rotation of said worm screw is by a nut-operated device.

11. Device according to claim 10, characterized in that the first end of the worm screw of the ram is force-fitted into a tube fixed to a cradle.

12. Device according to claim 1, characterized in that the base is formed by a rectangular frame bearing roller means constituted by two front wheels and two rear wheels as well as two additional front and rear wheels each bearing a jack capable of making said additional wheels rise and descend along an axis, said jacks being coupled in pairs by a detachable, telescopic sleeve.

13. Device according to claim 1, characterized in that the base is provided with screws for locking the device when it is at a stop.

14. Device according to claim 1, characterized in that said independent means for the transverse translation of the ram each comprise a worm screw device perpendicular to the ram, driving at least one nut fixedly joined to said ram in said transverse translation.

15. Device according to claim 14, characterized in that said worm screw device of said independent means is fixed to the top of the corresponding hoisting means by a U-shaped frame.

16. Device according to claim 15, characterized in that the worm screw of said hoisting means is fixed at a second end to a plate bearing said U-shaped frame.

17. Device according to claim 16, characterized in that said cradle is fixedly joined to two nuts of the worm screw device of the independent means by two parallel rails fixed to longitudinal uprights of the cradle and sliding axially in two suspension elements respectively fixed to said nuts.

18. Device according to claim 1, characterized in that said means for rotating the suction cap structure about the axis of the ram comprises firstly, a first circular deck, fixed with respect to said ram and provided with a circular slot concentric to the ram and, secondly, a second mobile deck, fixedly joined to said suction cap structure and bearing a screw capable of shifting in the slot of said fixed deck.

19. Device according claim 18, characterized in that said means for rotating the suction cap structure about an axis parallel to the direction of the vertical motion of the hoisting means includes a head fixed with respect to the mobile deck and a bearing means for the hinging on said axis of a pivoting head fixedly joined to the suction cap structure.

20. Device according to claim 1, characterized in that the suction cap structure is constituted by a set of bars defining a diamond.

21. Device according to claim 20, characterized in that the suction cap structure comprises four and two suction caps positioned respectively along a large diagonal and a small diagonal of said diamond.

22. Device according to claim 20 characterized in that said suction cap structure has two detachable auxiliary suction caps and one detachable auxiliary suction cap placed respectively at the ends of the large diagonal and at one end of the small diagonal of the diamond.

23. Device according to claim 1, characterized in that said ram has a deflection-preventive device.

24. Device according to claim 23, characterized in that said deflection-preventive device has a median vertical rod fixedly joined to a nut fixed to the worm screw of the ram, the deflection preventive device bears a pulley and a cable passing through said pulley, the cable connected at one end to said tube and at another end to a second rod fixed by a prop to a second end of said worm screw of the ram, at the end bearing the suction cap structure.

25. Device according to claim 1, characterized in that the base comprises a horizontal rear bar for guiding the device.

26. Device according to claim 25, characterized in that said horizontal rear bar bears mobile levers for starting under heavy loads and for emergency braking.

27. Device according to claim 26, characterized in that said mobile levers are suspended by magnets from the horizontal rear bar.

* * * * *